US011301726B2

(12) United States Patent
Chen et al.

(10) Patent No.: US 11,301,726 B2
(45) Date of Patent: Apr. 12, 2022

(54) ANCHOR DETERMINATION METHOD AND APPARATUS, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Kai Chen, Beijing (CN); Jiaqi Wang, Beijing (CN); Shuo Yang, Beijing (CN); Chen Change Loy, Beijing (CN); Dahua Lin, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 95 days.

(21) Appl. No.: 16/854,742

(22) Filed: Apr. 21, 2020

(65) Prior Publication Data

US 2020/0250495 A1 Aug. 6, 2020

Related U.S. Application Data

(63) Continuation of application No. PCT/CN2019/092370, filed on Jun. 21, 2019.

(30) Foreign Application Priority Data

Dec. 29, 2018 (CN) .......................... 201811639702.9

(51) Int. Cl.
*G06K 9/62* (2022.01)
*G06T 7/136* (2017.01)
(Continued)

(52) U.S. Cl.
CPC ............. *G06K 9/6267* (2013.01); *G06N 3/04* (2013.01); *G06T 7/136* (2017.01); *G06V 10/48* (2022.01)

(58) Field of Classification Search
CPC .... G06K 9/6267; G06K 9/4633; G06T 7/136; G06N 3/04; G06V 10/48
See application file for complete search history.

(56) References Cited

U.S. PATENT DOCUMENTS

2015/0363688 A1    12/2015  Gao et al.
2018/0032840 A1     2/2018  Yu et al.
2021/0383165 A1*   12/2021  Won .......................... G06N 3/08

FOREIGN PATENT DOCUMENTS

CN         106022237 A        10/2016
CN         106469304 A         3/2017
(Continued)

OTHER PUBLICATIONS

"Feature Pyramid Networks for Object Detection" Tsung-Yi Lin, Piotr Dollar, Ross Girshick, Kaiming He, Bharath Hariharan, Serge Belongie; Proceedings of the IEEE Conference on Computer Vision and Pattern Recognition (CVPR), 2017, pp. 2117-2125 (Year: 2017).*

(Continued)

*Primary Examiner* — Utpal D Shah
(74) *Attorney, Agent, or Firm* — Cooper Legal Group, LLC

(57) ABSTRACT

An anchor determination includes: performing feature extraction on an image to be processed to obtain a first feature map of the image to be processed; performing anchor prediction on the first feature map via an anchor prediction network to obtain position information of anchors and shape information of the anchors in the first feature map, the position information of the anchors referring to information about positions in the first feature map where the anchors are generated. A corresponding anchor determination apparatus and a storage medium are also provided.

20 Claims, 9 Drawing Sheets

(51) Int. Cl.
  *G06N 3/04* (2006.01)
  *G06V 10/48* (2022.01)

(56) References Cited

FOREIGN PATENT DOCUMENTS

| | | |
|---|---|---|
| CN | 108460362 A | 8/2018 |
| CN | 108520450 A | 9/2018 |
| CN | 108764164 A | 11/2018 |
| CN | 108830196 A | 11/2018 |
| CN | 109801270 A | 5/2019 |
| JP | 09-282460 A | 10/1997 |
| JP | 2007025902 A | 2/2007 |
| JP | 2016153984 A | 8/2016 |
| JP | 2017520859 A | 7/2017 |
| JP | 2018147431 A | 9/2018 |
| TW | I641617 B | 11/2018 |
| WO | 2016086744 | 6/2016 |

OTHER PUBLICATIONS

Yang, Tong, et al. "Metaanchor: Learning to detect objects with customized anchors." arXiv preprint arXiv: 1807.00980 (2018). (Year : 2018).*
Wang, Jiaqi, et al. "Region proposal by guided anchoring." Proceedings of the IEEE/CVF Conference on Computer Vision and Pattern Recognition. 2019. (Year: 2019).*
"Study of Object Detection Based on Faster R/CNN", Oct. 2017, Bin Liu, Wencang Zhao and Qiaoqiao Sun, IEEE Chinese Automation Congress (CAC), United States, IEEE, 5 pgs.
First Office Action of the Japanese application No. 2020-524186, dated May 11, 2021, 6 pgs.
English translation of the Written Opinion of the International Search Authority in the international application No. PCT/CN2019/092370, dated Oct. 8, 2019, 5 pgs.
International Search Report in the international application No. PCT/CN2019/092370, dated Oct. 8, 2019, 9 pages.
Jiaqi Wang, et al. "Region Proposal by Guided Anchoring", Apr. 12, 2019, 12 pages.
First Office Action of the Chinese application No. 201811639702.9, dated Aug. 12, 2020, 20 pgs.

* cited by examiner

ANCHOR DETERMINATION METHOD AND APPARATUS, ELECTRONIC DEVICE, AND STORAGE MEDIUM

CROSS-REFERENCE TO RELATED APPLICATIONS

The present application is a continuation of International Application No. PCT/CN2019/092370, filed on Jun. 21, 2019, which claims priority to Chinese Patent Application No. 201811639702.9, filed on Dec. 29, 2018. The disclosures of International Application No. PCT/CN2019/092370 and Chinese Patent Application No. 201811639702.9 are hereby incorporated by reference in their entireties.

BACKGROUND

An anchor is a basic element in the current object detection technology, and is also a foundation stone of a region proposal algorithm. Most of the current object detectors depend on a scheme for generating dense and uniform anchors, i.e., uniform anchors are generated according to predetermined dimension, length-width ratio, and step length in a full image.

SUMMARY

The present disclosure relates to the technical field of image processing, and in particular, to an anchor determination method and apparatus, an electronic device, and a storage medium.

Embodiments of the present disclosure provide technical solutions for anchor determination.

According to one aspect of the embodiments of the present disclosure, provided is an anchor determination method, including: performing feature extraction on an image to be processed to obtain a first feature map of the image to be processed; and performing anchor prediction on the first feature map via an anchor prediction network to obtain position information of anchors and shape information of the anchors in the first feature map, the position information of the anchors referring to information about positions in the first feature map where the anchors are generated.

According to one aspect of the embodiments of the present disclosure, provided is an anchor determination apparatus, including: a memory storing processor-executable instructions; and a processor arranged to execute the stored processor-executable instructions to perform operations of: performing feature extraction on an image to be processed to obtain a first feature map of the image to be processed; and performing anchor prediction on the first feature map via an anchor prediction network to obtain position information of anchors and shape information of the anchors in the first feature map, the position information of the anchors referring to information about positions in the first feature map where the anchors are generated.

According to one aspect of the embodiments of the present disclosure, provided is an anchor determination apparatus, including: a feature extraction module, configured to perform feature extraction on an image to be processed to obtain a first feature map of the image to be processed; and an anchor prediction module, configured to perform anchor prediction on the first feature map via an anchor prediction network to obtain position information of anchors and shape information of the anchors in the first feature map, the position information of the anchors referring to information about positions in the first feature map where the anchors are generated.

According to one aspect of the embodiments of the present disclosure, provided is a non-transitory computer-readable storage medium having stored thereon computer program instructions that, when executed by a processor, cause the processor to implement operations of an anchor determination method, the method including: performing feature extraction on an image to be processed to obtain a first feature map of the image to be processed; and performing anchor prediction on the first feature map via an anchor prediction network to obtain position information of anchors and shape information of the anchors in the first feature map, the position information of the anchors referring to information about positions in the first feature map where the anchors are generated.

It should be understood that the above general description and the following detailed description are merely exemplary and explanatory, and are not intended to limit the present disclosure. The other features and aspects of the present disclosure can be described more clearly according to the detailed descriptions of the exemplary embodiments in the accompanying drawings.

BRIEF DESCRIPTION OF DRAWINGS

The accompanying drawings here incorporated in the specification and constituting a part of the specification describe the embodiments of the present disclosure and are intended to explain the technical solutions of the present disclosure together with the specification.

DETAILED DESCRIPTION

Figure 1:
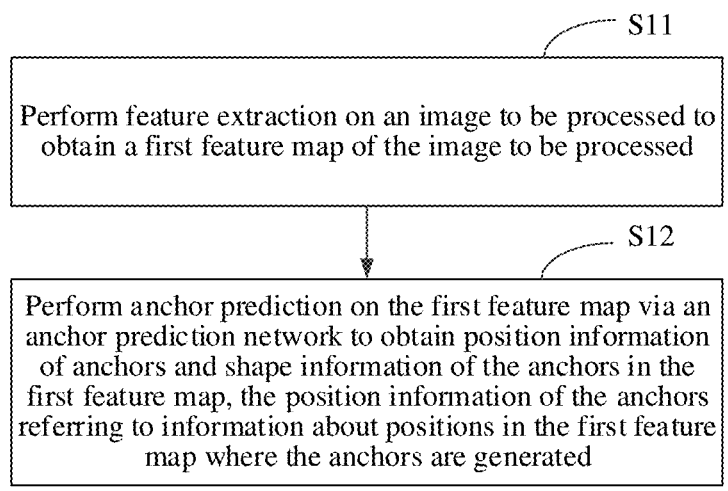
FIG. 1 illustrates a flowchart 1 of an anchor determination method according to embodiments of the present disclosure.

Various exemplary embodiments, features, and aspects of the present disclosure are described below in detail with reference to the accompanying drawings. The same reference numerals in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

The term "and/or" in the present disclosure only describes an association relation between associated objects, indicating that three relations may exist, for example, A and/or B may indicate three cases, i.e., A exists separately, A and B exist at the same time, and B exists separately. In addition, the term "at least one" as used herein means any one of multiple elements or any combination of at least two of the multiple elements, for example, including at least one of A, B, or C may indicate including any one or more elements selected from a set consisting of A, B, and C.

In addition, numerous details are given in the following detailed description for the purpose of better explaining the present disclosure. Persons skilled in the art should understand that the present disclosure can still be implemented even without some of those details. In some examples, methods, means, elements, and circuits that are well known to persons skilled in the art are not described in detail so that the principle of the present disclosure becomes apparent.

FIG. 1 illustrates of flowchart 1 of an anchor determination method according to embodiments of the present disclosure. The anchor determination method may be performed by a terminal device or other processing devices (for example, a server), where the terminal device may be a User Equipment (UE), a mobile device, a user terminal, a terminal, a cellular phone, a cordless phone, a Personal Digital Assistant (PDA), a handheld device, a computing device, a vehicle-mounted device, a wearable device, or the like. In some possible implementations, the anchor determination method may be implemented by a processor by invoking computer-readable instructions stored in a memory.

As shown in FIG. 1, the method includes the following operations.

At operation S11, feature extraction is performed on an image to be processed to obtain a first feature map of the image to be processed.

In one embodiment, the image to be processed may be a scene image, which is acquired by an image acquisition device (for example, a camera), of a certain region (for example, a mall entrance and a road intersection), and may also be a directly inputted image or video frame to be saved. The image to be processed may include one or multiple targets or objects to be detected, for example, a person, an animal, a vehicle, or the like. For example, the image to be processed may be a scene picture that "a golden retriever basks". In this implementation, the position and shape of the "golden retriever" in the scene picture may be detected by means of anchor detection.

At operation S12, anchor prediction is performed on the first feature map via an anchor prediction network to obtain position information of anchors and shape information of the anchors in the first feature map, the position information of the anchors referring to information about positions in the first feature map where the anchors are generated.

In one embodiment, an anchor is configured to represent a region (a rectangular box) in which a target or object may exist in a feature map, where a central point of the rectangular box may be configured to represent the position of the anchor, and the length and the width of the rectangular box may be configured to represent the shape of the anchor. It should be understood that the region where the anchor is located may also be represented in other shapes, and no limitation is made thereto in the embodiments of the present disclosure.

In one embodiment, the anchor prediction network may be configured to predict the positions and shapes of the anchors that can be generated in the first feature map. The anchor prediction network may include, for example, a Convolutional Neural Network (CNN), and the specific type of the anchor prediction network is not limited in the embodiments of the present disclosure.

According to the anchor determination method of the embodiments of the present disclosure, the anchor prediction can be performed on the feature map of the image to be processed to obtain the position information of the anchors and the shape information of the anchors, so that non-uniform anchors of arbitrary size and shape can be generated, thereby improving the accuracy rate of object detection.

In one embodiment, at operation S11, the feature extraction is performed on the image to be processed to obtain the first feature map of the image to be processed. Operation S11 may include: performing the feature extraction on the image to be processed by using a pre-trained feature extraction network to obtain the first feature map of the image to be processed.

For example, the feature extraction network may be a pre-trained CNN, and the image to be processed is inputted into the feature extraction network for processing to obtain the first feature map of the image to be processed.

In one embodiment, the feature extraction network includes multiple convolution layers and the sizes of convolution kernels of the convolution layers are different. In this case, the obtained first feature map may include multiple feature maps having different sizes. The specific network type of the feature extraction network and the number of the first feature maps are not limited in the embodiments of the present disclosure.

In one embodiment, according to the obtained first feature map, at operation S12, the positions where the anchors can be generated and the shapes of the anchors in the first feature map can be predicted via the anchor prediction network.

In one embodiment, the anchor prediction network may include a position prediction sub-network, and at operation S12, performing the anchor prediction on the first feature map via the anchor prediction network to obtain the position information for generating the anchors in the first feature map includes: inputting the first feature map into the position prediction sub-network to determine probabilities of generating the anchors in positions in the first feature map; and determining, as the position information of the anchors, information about positions where the probabilities are greater than or equal to a preset threshold.

For example, the position prediction sub-network may be configured to predict the positions of the anchors. The position prediction sub-network may at least include a convolution layer and an activation layer (for example, a sigmoid activation layer). For a first feature map in the shape of M*C*H*W (where M represents batch size), C represents the number of first channels of the feature map, and H and W respectively represent the height and width of the first feature map), the first feature map may be inputted into the convolution layer (for example, the size of the convolution kernel is A×A, where A is an integer greater than or equal to 1) for processing, and the feature map in the shape of M*1*H*W is outputted. Then the feature map in the shape of M*1*H*W is inputted into the activation layer for processing, and the probabilities of generating the anchors in the positions (H*W positions) in the first feature map can be obtained.

In one embodiment, information about positions where the probabilities are greater than or equal to the preset threshold may be determined as the position information of the anchors.

That is, a threshold P (0<P<1) may be preset, so as to filter out all the positions of which the probabilities are less than the threshold P.

The larger the threshold is, the less the number of the generated anchors is; otherwise, the smaller the threshold is, the more the number of the generated anchors is. When the number of the generated anchors is small, the recommended region is small, and the amount of computations of target detection is also small. Persons skilled in the art can set the threshold P according to actual conditions, and the specific value of the threshold P is not limited in the embodiments of the present disclosure.

In this way, the position information of the anchors that can be generated in the first feature map can be determined, so as to generate non-uniform anchors.

In one embodiment, the anchor prediction network may include a shape prediction sub-network, and at operation S12, performing the anchor prediction on the first feature map via the anchor prediction network to obtain the shape information of the anchors in the first feature map may include: inputting the first feature map into the shape prediction sub-network to determine the shape information of the anchors.

For example, the shape prediction sub-network may be configured to predict the shapes of the anchors. The shape prediction sub-network may at least include a convolution layer. For the first feature map in the shape of M*C*H*W, the first feature map may be inputted into the convolution layer (for example, the size of the convolution kernel is B×B, where B is an integer greater than or equal to 1) for processing, and the feature map in the shape of M*2*H*W is outputted. 2 represents two channels, the respectively represented height and width (relative values) of the anchor predicted in each position are recorded as dh and dw.

In one embodiment, an actual value h of the height of the anchor can be calculated by means of a formula h=8*s*exp (dh), an actual value w of the width of the anchor can be calculated by means of a formula w=8*s*exp(dw), where s is used for representing a step length of the convolution layer of the shape prediction sub-network.

In one embodiment, the shape information of all the anchors in the first feature map can be determined according to the height and width of the anchor predicted in each position. In this way, the shape information of the anchors that can be generated can be determined according to the position information of the anchors obtained by the position prediction sub-network.

In this way, the shape information of the anchors that can be generated in the first feature map can be determined, so as to generate anchors of arbitrary size and shape.

In one embodiment, the position information and shape information of an anchor can be represented by means of a four-dimensional feature vector (x, y, a, b). x and y respectively represent the horizontal coordinate and the vertical coordinate of the position (the central point of the rectangular box) of the anchor in the first feature map, and a and b respectively represent the height and the width of the region (the rectangular box) of the anchor.

In one embodiment, the position information and shape information of the anchor can further be represented by means of a four-dimensional feature vector (x1, y1, x2, y2). x1 and y1 respectively represent the horizontal coordinate and the vertical coordinate of an upper left vertex of the region (the rectangular box) of the anchor in the first feature map, and x2 and y2 respectively represent the horizontal coordinate and the vertical coordinate of a lower right vertex of the region of the anchor in the first feature map. Specific representation modes of the position information and shape information of the anchor are not limited in the embodiments of the present disclosure.

Figure 2:
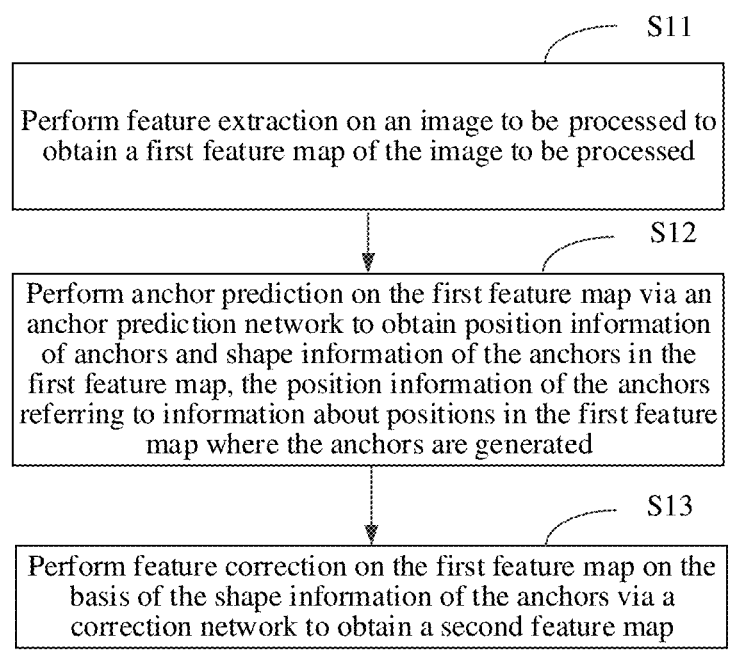
FIG. 2 illustrates a flowchart 2 of an anchor determination method according to embodiments of the present disclosure.

FIG. 2 illustrates flowchart 2 of an anchor determination method according to embodiments of the present disclosure. In one embodiment, as shown in FIG. 2, the anchor determination method may further include the following operation.

At operation S13, feature correction is performed on the first feature map based on the shape information of the anchors via a correction network to obtain a second feature map.

In one embodiment, the correction network can be configured to correct a deviation of the first feature map. The shape information of the anchors is inputted into the correction network for processing, and the corrected feature map (the second feature map) can be outputted. The correction network may be, for example, a CNN, and the specific network type of the correction network is not limited in the embodiments of the present disclosure.

In one embodiment, the correction network may include a first convolution layer and a second convolution layer, and operation S13 may include: inputting the shape information of the anchors into the first convolution layer to obtain an offset of the second convolution layer; and inputting the first feature map and the offset into the second convolution layer to obtain the second feature map For example, the first convolution layer of the correction network may be configured to determine the offset of the second convolution layer, where the size of the convolution kernel of the first convolution layer may be, for example, 1×1. The shape information of the anchors is inputted into the first convolution layer, and the offset of the second convolution layer can be outputted.

In one embodiment, the second convolution layer of the correction network may be configured to correct the feature map. The second convolution layer may be a deformable convolution layer, and the size of the convolution kernel of the second convolution layer may be N×N (N is an integer greater than 1, for example, N=3). The first feature map and the offset are inputted into the second convolution layer for processing, and the corrected feature map (the second feature map) can be outputted.

In this way, the correction of the first feature map can be implemented, thereby improving the accuracy rate of object detection.

The anchor determination method according to the embodiments of the present disclosure may be used for object detection, for example, may be applied to single-stage object detection or two-stage object detection.

Figure 3:
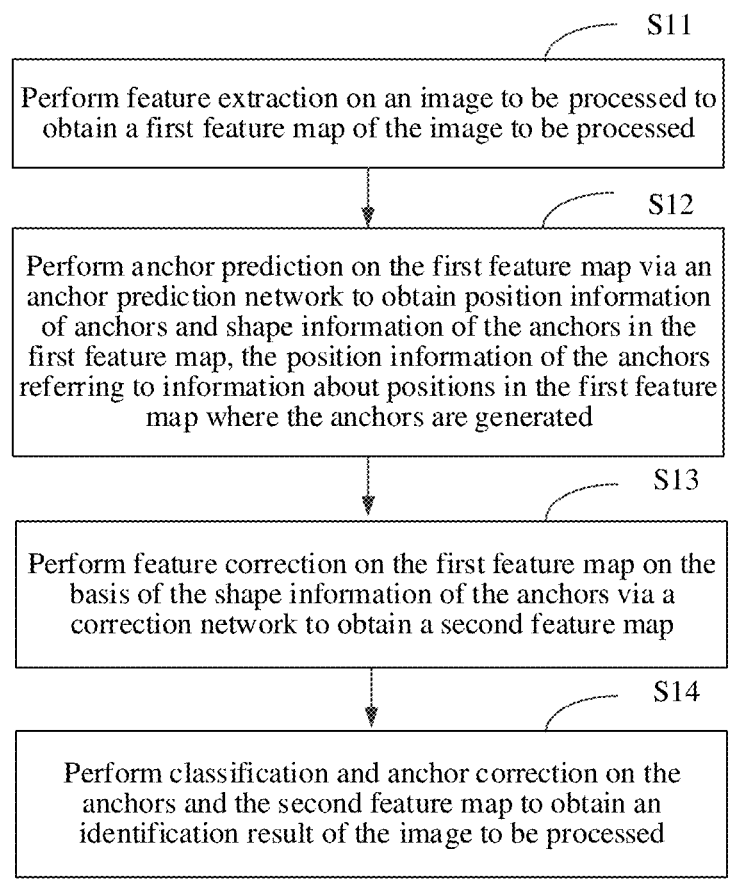
FIG. 3 illustrates a flowchart 3 of an anchor determination method according to embodiments of the present disclosure.

FIG. 3 illustrates flowchart 3 of an anchor determination method according to embodiments of the present disclosure. In one embodiment, as shown in FIG. 3, the anchor determination method further includes: operation S14, performing classification and anchor correction on the anchors and the second feature map to obtain an identification result of the image to be processed.

For example, for the single-stage object detection, the classification and the anchor correction can be directly performed on the anchors and the second feature map to obtain the identification result. The classification and the anchor correction may be concurrently performed and may also be successively performed, and the order for performing the classification and the anchor correction is not limited in the embodiments of the present disclosure.

In one embodiment, for the classification of the regions (rectangular boxes) of the anchors, the anchors and the second feature map can be inputted into a classification network for processing, where the classification network may include one or more convolution layers and convolution layers of which the number of output channels is the number of classes. Classification probabilities in which the anchors belong to each class can be outputted after passing through one or more convolution layers of the classification network and then passing through the convolution layers of which the number of output channels is the number of classes. In this way, classification probabilities in which the anchors belong to respective classes may be determined as an anchor classification result.

In one embodiment, for the anchor correction, a correction process may be implemented by means of anchor bounding box regression. The anchors and the second feature map may be inputted into an anchor correction network for processing, where the anchor correction network may include one or more convolution layers and a convolution layer of which the number of the output channels is 4. The positions (the four-dimensional feature vectors) of the regions (the rectangular boxes) of the anchors can be outputted after passing through one or more convolution layers of the anchor correction network and then passing through the convolution layer of which the number of the output channels is 4, for example, the coordinates of the central points and the widths and heights of the rectangular boxes, or the coordinates of the upper left vertexes and the coordinates of the lower right vertexes, or the like of the rectangular boxes. In this way, the positions of the rectangular boxes may be determined as an anchor correction result.

In one embodiment, the identification result of the image to be processed can be determined according to the obtained anchor classification result and anchor correction result. That is, the identification result includes the class and regional coordinates of a detected object in the image to be processed.

In this way, the identification result of the single-stage object detection is obtained, thereby improving the accuracy rate of object detection.

Figure 4:
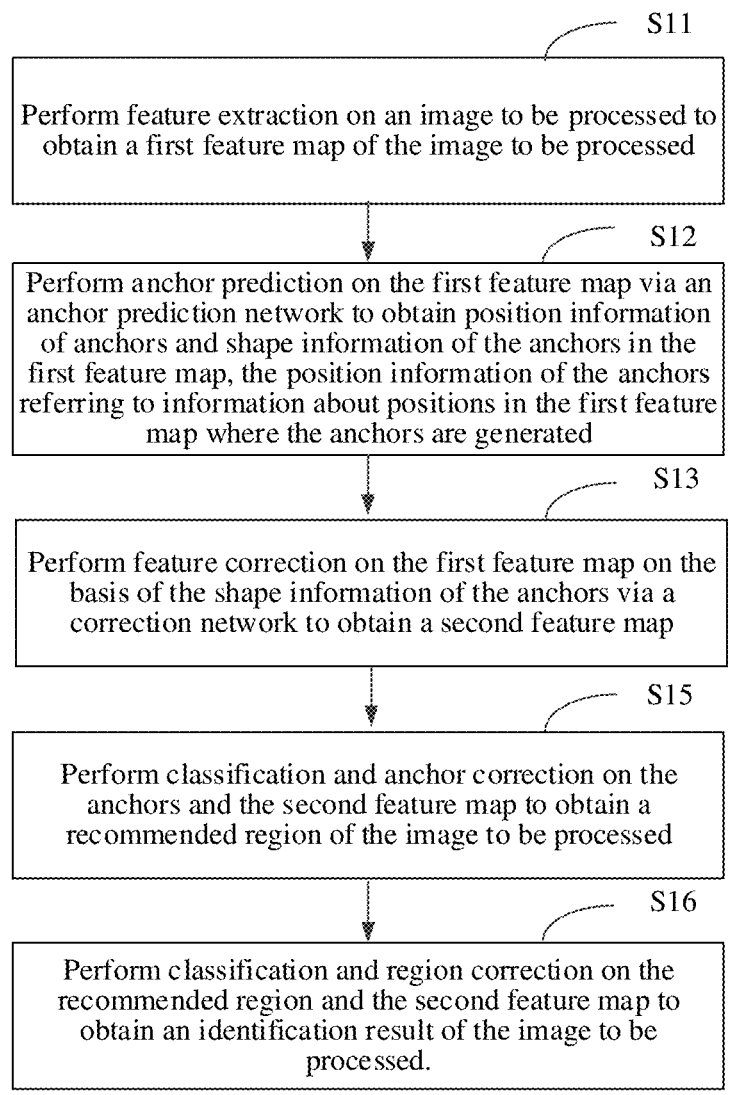
FIG. 4 illustrates a flowchart 4 of an anchor determination method according to embodiments of the present disclosure.

FIG. 4 illustrates flowchart 4 of an anchor determination method according to embodiments of the present disclosure. In one embodiment, as shown in FIG. 4, the anchor determination method may further include the following operations.

At operation S15, classification and the anchor correction are performed on the anchors and the second feature map to obtain a recommended region of the image to be processed.

At operation S16, classification and region correction are performed on the recommended region and the second feature map to obtain an identification result of the image to be processed.

For example, for two-stage object detection, the classification and the anchor correction may be performed on the anchors and the second feature map firstly in operation S15 to obtain the recommended region of the image to be processed. The classification and the anchor correction may be concurrently performed and may also be successively performed, and the order for performing the classification and the anchor correction is not limited in the embodiments of the present disclosure.

In one embodiment, for the classification in operation S15, the anchors and the second feature map may be inputted into a classification convolutional network (for example, a binary classifier) for processing to obtain the classes of the anchors, and the region of the anchor of a preset class (for example, a foreground class) is determined as the recommended region of the image to be processed. The specific type of the classification convolutional networks is not limited in the present disclosure.

In one embodiment, for the anchor correction in operation S15, the correction process can be implemented by means of anchor bounding box regression. The anchors and the second feature map may be inputted into the anchor correction network for processing, and the positions of the regions (rectangular boxes) of all the anchors can be outputted. In this way, according to the recommended region obtained by means of classification, the position of the recommended region after the anchor correction is performed can be determined. The specific type of the anchor correction network is not limited in the present disclosure.

In one embodiment, after the recommended region is determined, the classification and the region correction may be performed on the recommended region and the second feature map to obtain the identification result of the image to be processed in operation S16. The classification and the region correction may be concurrently performed and may also be successively performed, and the order for performing the classification and the region correction is not limited in the present disclosure.

In one embodiment, for the classification in operation S16, the recommended region and the second feature map may be inputted into the classification network (for example, a multinomial classifier) for processing, and classification probabilities in which the recommended region belongs to each class are outputted. In this way, classification probabilities in which the recommended region belongs to respective classes may be determined as a classification result of the recommended region. The specific type of the classification network is not limited in the present disclosure.

In one embodiment, for the region correction in operation S16, the correction process may be implemented by means of anchor bounding box regression. The recommended region and the second feature map may be inputted into the region correction network for processing, and the position of the recommended region is outputted. In this way, the correction result of the recommended region can be determined.

In one embodiment, the identification result of the image to be processed can be determined according to the classification result and the correction result of the recommended region. That is, the identification result includes the class and regional coordinates of a detected object in the image to be processed.

In this way, the identification result of the two-stage object detection can be obtained, thereby improving the accuracy rate of object detection.

In one embodiment, the anchor determination method may further include a training process for the anchor prediction network. For example, the anchor prediction network is trained by means of a labeled training set. Labeling information of the training set is used for labeling the position, shape, and/or class of a target/object in a training image of the training set.

In one embodiment, in the processing of training the anchor prediction network, the training image of the training set may be inputted into the anchor prediction network for processing to obtain a prediction result; a network loss of the anchor prediction network is determined according to the prediction result and the labeling information of the training image; and the anchor prediction network is trained according to the network loss.

The network loss of the anchor prediction network may include network losses of a position prediction sub-network and of a shape prediction sub-network. The network loss of the anchor prediction network may be represented as:

$$L = \lambda_1 L_{loc} + \lambda_2 L_{shape} + L_{cls} + L_{reg}$$

L is used for representing the network loss of the anchor prediction network, $L_{loc}$ is used for representing the network loss of the position prediction sub-network, $L_{shape}$ is used for representing the network loss of the shape prediction sub-network, $L_{cls}$ is used for representing a regression loss of the anchor prediction network, and $L_{reg}$ is used for representing a classification loss of the anchor prediction network. $\lambda_1$ is used for representing the weight of the network loss of the position prediction sub-network, and $\lambda_2$ is used for representing the weight of the network loss of the shape prediction sub-network.

The specific training mode for the anchor prediction network is not limited in the embodiments of the present disclosure.

Figure 5A:
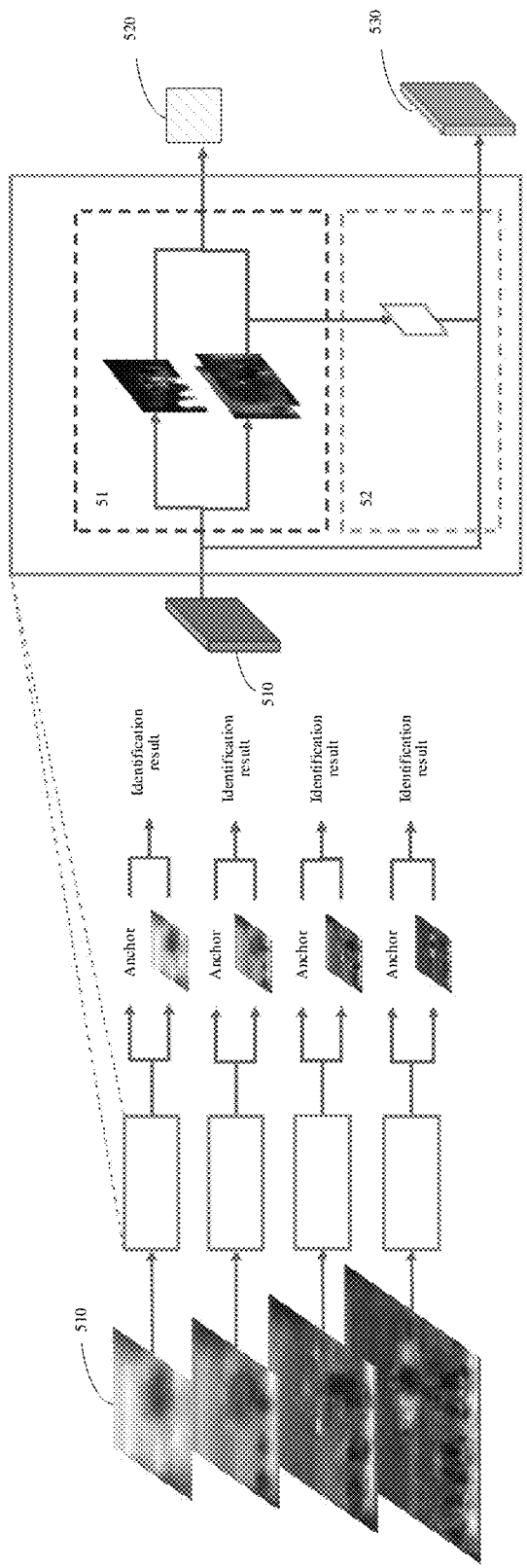
FIG. 5A and FIG. 5B illustrate schematic diagrams of application scenarios of an anchor determination method according to embodiments of the present disclosure.
Figure 5B:
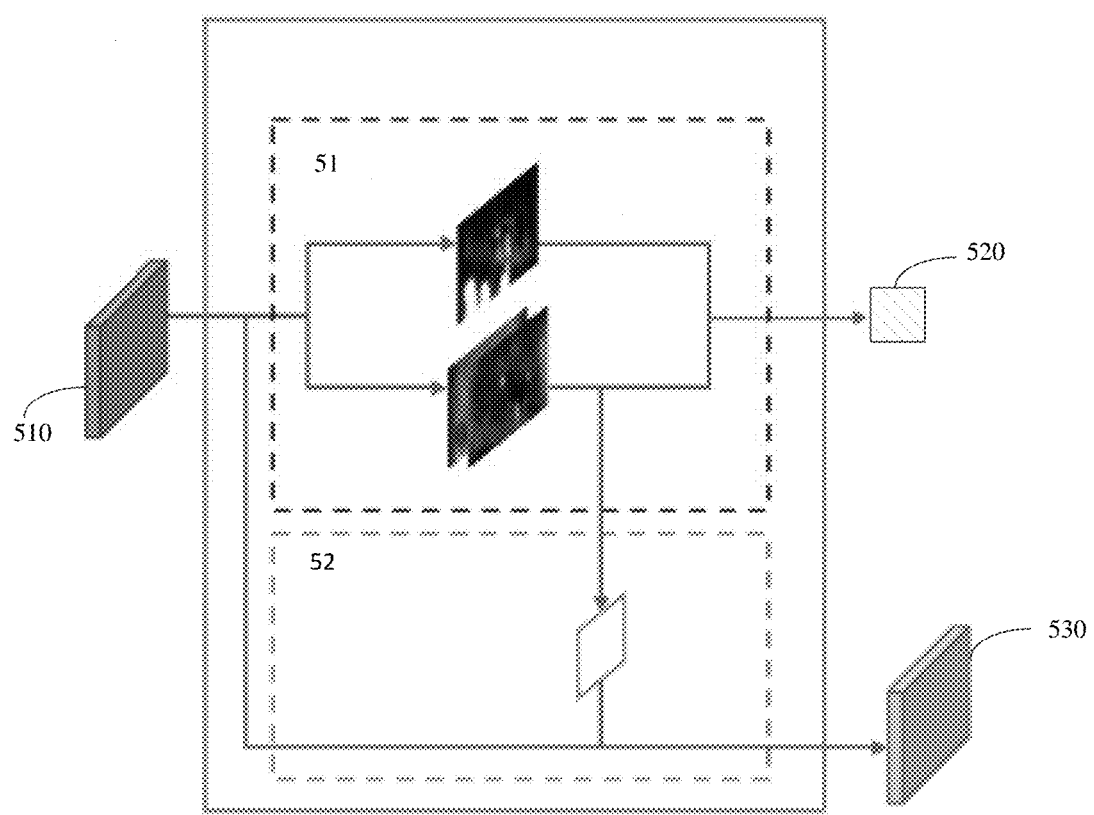

FIG. 5A and FIG. 5B illustrate schematic diagrams of application scenarios of an anchor determination method according to embodiments of the present disclosure. As shown in FIG. 5A, in the implementation, multiple first feature maps can be obtained from a feature set 510 including the multiple first feature maps, and are concurrently inputted into networks, and position and shape information 520 of the anchors and the corrected feature map (a second feature map 530) are respectively obtained by each anchor prediction network. Based on the position and shape information 520 of the anchors and the second feature map 530, single-stage object detection or two-stage object detection may be performed to obtain an identification result (prediction).

As shown in FIG. 5B, in the implementation, the network includes an anchor prediction network 51 and a correction network 52, where the anchor prediction network 51 includes a position prediction sub-network and a shape prediction sub-network.

In the implementation, feature extraction may be performed on an image to be processed to obtain a first feature map 510; the first feature map 510 is inputted into the position prediction sub-network and the shape prediction sub-network of the anchor prediction network 51 for processing, and the position and shape information 520 of the anchors can be outputted; the first feature map 510 and the shape information of the anchors are inputted into the correction network 52 for processing, and the corrected feature map (a second feature map 530) can be outputted, so as to implement the whole process of anchor determination and feature map correction.

In the anchor determination method according to the embodiments of the present disclosure, generation of uniform anchors in predefined shapes by means of a sliding window in the related art can be replaced with generation of sparse anchors in arbitrary shapes, and the feature map is corrected according to the shapes of the anchors. According to the embodiments of the present disclosure, a recall rate of a region proposal network (region recommendation) can be significantly improved; and the embodiments can be applied to scenarios, such as face detection and autonomous driving, to improve the accuracy rate and speed of detection of faces, vehicles, or general objects or the like.

It should be understood that the foregoing various method embodiments mentioned in the present disclosure may be combined with each other to form a combined embodiment without departing from the principle logic. Details are not described herein again due to space limitation.

Figure 6:
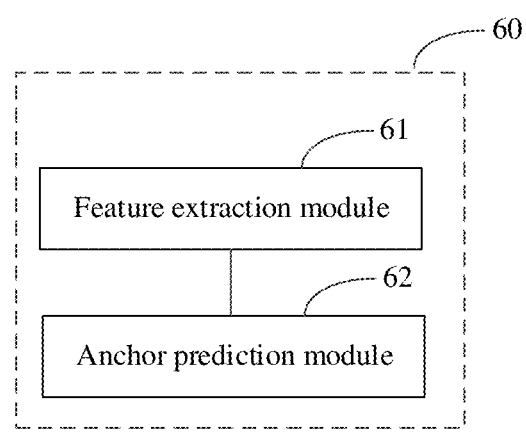
FIG. 6 illustrates a block diagram of an anchor determination apparatus according to embodiments of the present disclosure.

FIG. 6 illustrates a block diagram of an anchor determination apparatus according to embodiments of the present disclosure. As shown in FIG. 6, an anchor determination apparatus 60 includes:

a feature extraction module 61, configured to perform feature extraction on an image to be processed to obtain a first feature map of the image to be processed;

an anchor prediction module 62, configured to perform anchor prediction on the first feature map via an anchor prediction network to obtain position information of anchors and shape information of the anchors in the first feature map, the position information of the anchors referring to information about positions in the first feature map where the anchors are generated.

In one embodiment, the anchor prediction network includes a position prediction sub-network, and the anchor prediction module includes: a probability generation sub-module, configured to input the first feature map into the position prediction sub-network to determine probabilities of generating the anchors in positions in the first feature map; and a position information determination sub-module, configured to determine, as the position information of the anchors, information about positions where the probabilities are greater than or equal to a preset threshold.

In one embodiment, the anchor prediction network includes a shape prediction sub-network, and the anchor prediction module includes: a shape information determination sub-module, configured to input the first feature map into the shape prediction sub-network to determine the shape information of the anchors.

In one embodiment, the anchor determination apparatus further includes: a correction module, configured to perform feature correction on the first feature map based on the shape information of the anchors via a correction network to obtain a second feature map.

In one embodiment, the correction network includes a first convolution layer and a second convolution layer, and the correction module includes: a first convolution sub-module, configured to input the shape information of the anchors into the first convolution layer to obtain an offset of the second convolution layer; and a second convolution sub-module, configured to input the first feature map and the offset into the second convolution layer to obtain the second feature map.

In one embodiment, the apparatus further includes: a first identification result determination module, configured to perform classification and anchor correction on the anchors and the second feature map to obtain an identification result of the image to be processed.

In one embodiment, the apparatus further includes: a recommended region determination module, configured to perform classification and anchor correction on the anchors and the second feature map to obtain a recommended region of the image to be processed; and a second identification result determination module, configured to perform classification and region correction on the recommended region and the second feature map to obtain an identification result of the image to be processed.

In one embodiment, the feature extraction module includes: a feature extraction sub-module, configured to perform the feature extraction on the image to be processed by using a pre-trained feature extraction network to obtain the first feature map of the image to be processed.

In some embodiments, the functions provided by or the modules included in the apparatus provided by the embodiments of the present disclosure may be used to implement the method described in the foregoing method embodiments. For specific implementations, reference may be made to the description in the method embodiments above. For the purpose of brevity, details are not described herein again.

The embodiments of the present disclosure further provide a computer-readable storage medium, having computer program instructions stored thereon, where when the computer program instructions are executed by a processor, the foregoing method is implemented. The computer-readable storage medium may be a non-volatile computer-readable storage medium.

The embodiments of the present disclosure further provide an electronic device, including: a processor; and a memory configured to store processor-executable instructions, where the processor is configured to execute the foregoing anchor determination method.

Figure 7:
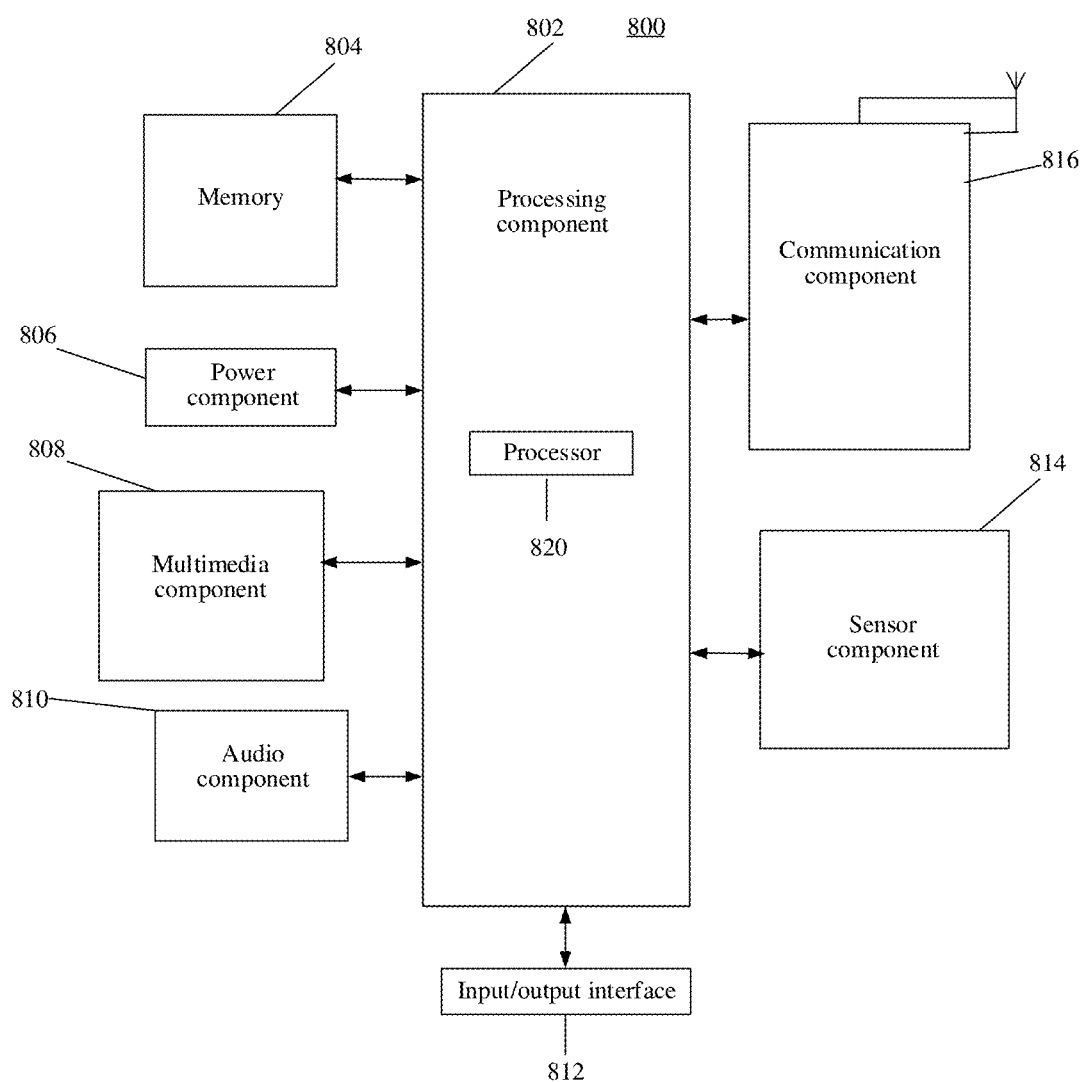
FIG. 7 illustrates a block diagram of an electronic device according to embodiments of the present disclosure.

FIG. 7 is a block diagram of an electronic device 800 according to one exemplary embodiment. For example, the electronic device 800 may be a terminal such as a mobile phone, a computer, a digital broadcast terminal, a message transceiving device, a game console, a tablet device, a medical device, exercise equipment, and a personal digital assistant.

With reference to FIG. 7, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the operations of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and the like. The memory 804 may be implemented by any type of volatile or non-volatile storage device, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power component 806 provides power for various components of the electronic device 800. The power component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a Microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may also include a light sensor, such as a Complementary Metal-Oxide Semiconductor (CMOS) or a Charge Coupled Device (CCD) image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel In an exemplary embodiment, the communication component 816 further includes a Near Field Communication (NFC) module to facilitate short-range communication. For example, the NFC module may be implemented based on Radio Frequency IDentification (RFID) technology, Infrared Data Association (IrDA) technology, Ultra WideBand (UWB) technology, BlueTooth (BT) technology, and other technologies.

In an exemplary embodiment, the electronic device 800 may be implemented by one or more Application Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In an exemplary embodiment, is further provided is a non-volatile computer-readable storage medium, for example, a memory 804 including computer program instructions, which can be executed by the processor 820 of the electronic device 800 to implement the method above.

Figure 8:
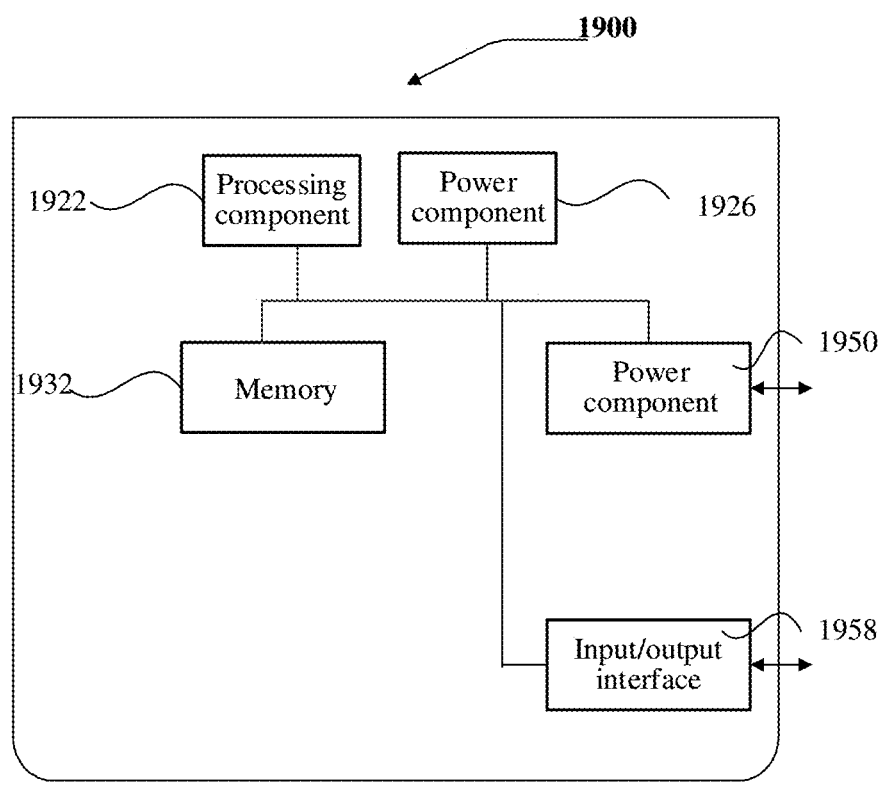
FIG. 8 illustrates a block diagram of another electronic device according to embodiments of the present disclosure.

FIG. 8 is a block diagram of another electronic device 1900 according to one exemplary embodiment. For example, the electronic device 1900 may be provided as a server. With reference to FIG. 8, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Furthermore, the processing component 1922 is configured to execute the instructions so as to execute the method above.

The electronic device 1900 may further include a power component 1926 configured to execute power management of the electronic device 1900, a wired or wireless network interface 1950 configured to connect the electronic device 1900 to the network, and an Input/Output (I/O) interface 1958. The electronic device 1900 may be operated based on an operating system stored in the memory 1932, such as Windows Server™, Mac OS X™, Unix™, Linux™, Free-BSD™ or the like.

In an exemplary embodiment, further provided is a non-volatile computer-readable storage medium, for example, a memory 1932 including computer program instructions, which can be executed by the processing component 1922 of the electronic device 1900 to implement the method above.

The present disclosure may be a system, a method, and/or a computer program product. The computer program product may include a computer-readable storage medium having computer-readable program instructions thereon for enabling a processor to implement aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, a Random Access Memory (RAM), an Read-Only Memory (ROM), an Erasable Programmable Read-Only Memory (EPROM) or flash memory, a Static Random Access Memory (SRAM), a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination of the foregoing. A computer-readable storage medium, as used herein, is not to be construed as being transitory signals per se, such as radio waves or other freely propagating electromagnetic waves, electromagnetic waves propagating by means of a waveguide or other transmission media (e.g., light pulses passing through a fiber-optic cable), or electrical signals transmitted by means of a wire.

Computer-readable program instructions described herein can be downloaded to each computing/processing device from a computer-readable storage medium or to an external computer or external storage device via a network, for example, the Internet, a Local Area Network (LAN), a Wide Area Network (WAN) and/or a wireless network. The network may include copper transmission cables, optical fiber transmission, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within each computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. Computer-readable program instructions can be executed completely on a user computer, executed partially on the user computer, executed as an independent software package, executed partially on the user computer and partially on a remote computer, or executed completely on the remote computer or server. In a scenario involving a remote computer, the remote computer may be connected to a user computer via any type of network, including an LAN or a WAN, or the connection may be made to an external computer (for example, via the Internet by using an Internet service provider). In some embodiments, electronic circuitry including, for example, programmable logic circuitry, Field-Programmable Gate Arrays (FPGAs), or Programmable Logic Arrays (PLAs), may execute the computer-readable program instructions by utilizing state information of the computer-readable program instructions to personalize the electronic circuitry, in order to implement the aspects of the present disclosure.

The aspects of the present disclosure are described herein with reference to flowcharts and/or block diagrams of methods, apparatuses (systems), and computer program products according to the embodiments of the present disclosure. It should be understood that each block of the flowcharts and/or block diagrams, and combinations of the blocks in the flowcharts and/or block diagrams can be implemented by computer-readable program instructions.

These computer-readable program instructions may be provided to a processor of a general-purpose computer, special-purpose computer, or other programmable data processing apparatuses to produce a machine, such that the instructions, which are executed via the processor of the computer or other programmable data processing apparatuses, create means for implementing the functions/acts specified in one or more blocks in the flowcharts and/or block diagrams. These computer-readable program instructions may also be stored in a computer-readable storage medium that can cause a computer, a programmable data processing apparatus, and/or other devices to function in a particular manner, such that the computer-readable medium having instructions stored thereon includes an article of manufacture including instructions which implement the aspects of the functions/acts specified in one or more blocks of the flowcharts and/or block diagrams.

The computer-readable program instructions may also be loaded onto a computer, other programmable data processing apparatuses, or other devices to cause a series of operational operations to be performed on the computer, other programmable apparatuses or other devices to produce a computer implemented process, such that the instructions which are executed on the computer, other programmable apparatuses or other devices implement the functions/acts specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowcharts or block diagrams may represent a module, a program segment, or a portion of instruction, which includes one or more executable instructions for implementing the specified logical function. In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, can be implemented by special purpose hardware-based systems that perform the specified functions or acts or implemented by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to a person of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

The invention claimed is:

1. An anchor determination method, comprising:
   performing feature extraction on an image to be processed to obtain a first feature map of the image to be processed;
   performing anchor prediction on the first feature map via an anchor prediction network to obtain position information of anchors and shape information of the anchors in the first feature map, the position information of the anchors referring to information about positions in the first feature map where the anchors are generated; and
   performing feature correction on the first feature map based on the shape information of the anchors via a correction network to obtain a second feature map.

2. The method according to claim 1, wherein the anchor prediction network comprises a position prediction sub-network,
   wherein the performing the anchor prediction on the first feature map via the anchor prediction network to obtain the position information for generating the anchors in the first feature map comprises:
   inputting the first feature map into the position prediction sub-network to determine probabilities of generating the anchors in positions in the first feature map; and
   determining, as the position information of the anchors, information about positions where the probabilities are greater than or equal to a preset threshold.

3. The method according to claim 1, wherein the anchor prediction network comprises a shape prediction sub-network,
   wherein the performing the anchor prediction on the first feature map via the anchor prediction network to obtain the shape information of the anchors in the first feature map comprises:
   inputting the first feature map into the shape prediction sub-network to determine the shape information of the anchors.

4. The method according to claim 1, wherein the correction network comprises a first convolution layer and a second convolution layer,
   wherein the performing the feature correction on the first feature map based on the shape information of the anchors via the correction network to obtain the second feature map comprises:
   inputting the shape information of the anchors into the first convolution layer to obtain an offset of the second convolution layer; and
   inputting the first feature map and the offset into the second convolution layer to obtain the second feature map.

5. The method according to claim 1, further comprising:
   performing classification and anchor correction on the anchors and the second feature map to obtain an identification result of the image to be processed.

6. The method according to claim 1, further comprising:
   performing classification and anchor correction on the anchors and the second feature map to obtain a recommended region of the image to be processed; and
   performing classification and region correction on the recommended region and the second feature map to obtain an identification result of the image to be processed.

7. The method according to claim 1, wherein the performing the feature extraction on the image to be processed to obtain the first feature map of the image to be processed comprises:
   performing the feature extraction on the image to be processed by using a pre-trained feature extraction network to obtain the first feature map of the image to be processed.

8. An anchor determination apparatus, comprising:
   a memory storing processor-executable instructions; and
   a processor arranged to execute the processor-executable instructions to perform operations of:
   performing feature extraction on an image to be processed to obtain a first feature map of the image to be processed;
   performing anchor prediction on the first feature map via an anchor prediction network to obtain position information of anchors and shape information of the anchors in the first feature map, the position information of the anchors referring to information about positions in the first feature map where the anchors are generated; and performing feature correction on the first feature map based on the shape information of the anchors via a correction network to obtain a second feature map.

9. The apparatus according to claim 8, wherein the anchor prediction network comprises a position prediction sub-network, wherein the performing the anchor prediction on the first feature map via the anchor prediction network to obtain the position information for generating the anchors in the first feature map comprises:

inputting the first feature map into the position prediction sub-network to determine probabilities of generating the anchors in positions in the first feature map; and determining, as the position information of the anchors, information about positions where the probabilities are greater than or equal to a preset threshold.

10. The apparatus according to claim 8, wherein the anchor prediction network comprises a shape prediction sub-network, wherein the performing the anchor prediction on the first feature map via the anchor prediction network to obtain the shape information of the anchors in the first feature map comprises:

inputting the first feature map into the shape prediction sub-network to determine the shape information of the anchors.

11. The apparatus according to claim 8, wherein the correction network comprises a first convolution layer and a second convolution layer, wherein the performing the feature correction on the first feature map based on the shape information of the anchors via the correction network to obtain the second feature map comprises:

inputting the shape information of the anchors into the first convolution layer to obtain an offset of the second convolution layer; and inputting the first feature map and the offset into the second convolution layer to obtain the second feature map.

12. The apparatus according to claim 8, wherein the processor is arranged to execute the processor-executable instructions to further perform an operation of:

performing classification and anchor correction on the anchors and the second feature map to obtain an identification result of the image to be processed.

13. The apparatus according to claim 8, wherein the processor is arranged to execute the processor-executable instructions to further perform operations of:

performing classification and anchor correction on the anchors and the second feature map to obtain a recommended region of the image to be processed; and performing classification and region correction on the recommended region and the second feature map to obtain an identification result of the image to be processed.

14. The apparatus according to claim 8, wherein the performing the feature extraction on the image to be processed to obtain the first feature map of the image to be processed comprises:

performing the feature extraction on the image to be processed by using a pre-trained feature extraction network to obtain the first feature map of the image to be processed.

15. A non-transitory computer-readable storage medium having stored thereon computer program instructions that, when executed by a processor, cause the processor to implement operations of an anchor determination method, the method comprising:

performing feature extraction on an image to be processed to obtain a first feature map of the image to be processed;

performing anchor prediction on the first feature map via an anchor prediction network to obtain position information of anchors and shape information of the anchors in the first feature map, the position information of the anchors referring to information about positions in the first feature map where the anchors are generated; and performing feature correction on the first feature map based on the shape information of the anchors via a correction network to obtain a second feature map.

16. The non-transitory computer-readable storage medium according to claim 15, wherein the anchor prediction network comprises a position prediction sub-network, wherein the performing the anchor prediction on the first feature map via the anchor prediction network to obtain the position information for generating the anchors in the first feature map comprises:

inputting the first feature map into the position prediction sub-network to determine probabilities of generating the anchors in positions in the first feature map; and determining, as the position information of the anchors, information about positions where the probabilities are greater than or equal to a preset threshold.

17. The non-transitory computer-readable storage medium according to claim 15, wherein the anchor prediction network comprises a shape prediction sub-network, wherein the performing the anchor prediction on the first feature map via the anchor prediction network to obtain the shape information of the anchors in the first feature map comprises:

inputting the first feature map into the shape prediction sub-network to determine the shape information of the anchors.

18. The non-transitory computer-readable storage medium according to claim 15, wherein the correction network comprises a first convolution layer and a second convolution layer, wherein the performing the feature correction on the first feature map based on the shape information of the anchors via the correction network to obtain the second feature map comprises:

inputting the shape information of the anchors into the first convolution layer to obtain an offset of the second convolution layer; and inputting the first feature map and the offset into the second convolution layer to obtain the second feature map.

19. The non-transitory computer-readable storage medium according to claim 15, wherein the method further comprises:

performing classification and anchor correction on the anchors and the second feature map to obtain an identification result of the image to be processed.

20. The non-transitory computer-readable storage medium according to claim 15, wherein the method further comprises:
- performing classification and anchor correction on the anchors and the second feature map to obtain a recommended region of the image to be processed; and
- performing classification and region correction on the recommended region and the second feature map to obtain an identification result of the image to be processed.

\* \* \* \* \*